United States Patent
Sako et al.

(10) Patent No.: US 6,904,429 B2
(45) Date of Patent: *Jun. 7, 2005

(54) INFORMATION RETRIEVAL APPARATUS AND INFORMATION RETRIEVAL METHOD

(75) Inventors: Takayuki Sako, Tokyo (JP); Satoshi Kinoshita, Tokyo (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 308 days.

This patent is subject to a terminal disclaimer.

(21) Appl. No.: 10/189,482

(22) Filed: Jul. 8, 2002

(65) Prior Publication Data

US 2002/0194156 A1 Dec. 19, 2002

Related U.S. Application Data

(62) Division of application No. 09/161,383, filed on Sep. 28, 1998, now Pat. No. 6,442,540.

(30) Foreign Application Priority Data

Sep. 29, 1997 (JP) .............................................. 9-263606

(51) Int. Cl.$^7$ .............................................. G06F 17/30
(52) U.S. Cl. .............................. 707/3; 707/10; 704/10
(58) Field of Search .................... 707/1–10, 100–104.1; 704/9–10; 715/531–532, 500.1, 536

(56) References Cited

U.S. PATENT DOCUMENTS

| | | | | | |
|---|---|---|---|---|---|
| 5,576,954 | A | * | 11/1996 | Driscoll | 707/3 |
| 6,026,388 | A | * | 2/2000 | Liddy et al. | 707/1 |
| 6,076,088 | A | * | 6/2000 | Paik et al. | 707/5 |
| 6,442,540 | B2 | * | 8/2002 | Sako et al. | 707/3 |
| 6,662,152 | B2 | * | 12/2003 | Sako et al. | 704/9 |

* cited by examiner

*Primary Examiner*—Shahid Alam
*Assistant Examiner*—Jean Bolte Fleurantin
(74) *Attorney, Agent, or Firm*—Oblon, Spivak, McClelland, Maier & Neustadt, P.C.

(57) ABSTRACT

Character data of a word or phrase in a document is designated. Desired data is retrieved from a predetermined database on the basis of the designated character data. One sentence including at least the designated character data is cut out and subjected to sentence analysis. On the basis of a sentence analysis result, specific data is selected from the retrieval result acquired from the database. In addition, character data of a word or phrase in a document is designated. One sentence including at least the designated character data is cut out and subjected to sentence analysis to extract a keyword. A retrieval condition is prepared on the basis of the extracted keyword, and desired data is retrieved from a predetermined database on the basis of the retrieved conditional expression.

2 Claims, 16 Drawing Sheets

```
<headword>director<\headword>
<a part of speech>noun<\a part of speech>
<wordmeaning1>the head of an organization of government or
college<\wordmeaning1>
<wordmeaning2>the person in charge of supervising the artistic
aspects of movie or play<\wordmeaning2>
<wordmeaning3>a member of a governing board to whom the overall
direction of a company is left<\wordmeaning3>
    •
    •
```

......He is a director of this movie. ......

| WORD ORDER | HEADWORD | A PART OF SPEECH |
|---|---|---|
| 1 | he | PRONOUN |
| 2 | be | VERB |
| 3 | a | DETERMINER |
| 4 | director | NOUN |
| 5 | of | PREPOSITION |
| 6 | this | PRONOUN |
| 7 | movie | NOUN |

```
<headword>director<\headword>
<a part of speech>noun<\a part of speech>
<wordmeaning1>the head of an organization of government or
college<\wordmeaning1>
<wordmeaning2>the person in charge of supervising the artistic
aspects of movie or play<\wordmeaning2>
<wordmeaning3>a member of a governing board to whom the overall
direction of a company is left<\wordmeaning3>
                    .
                    .
```

FIG. 4

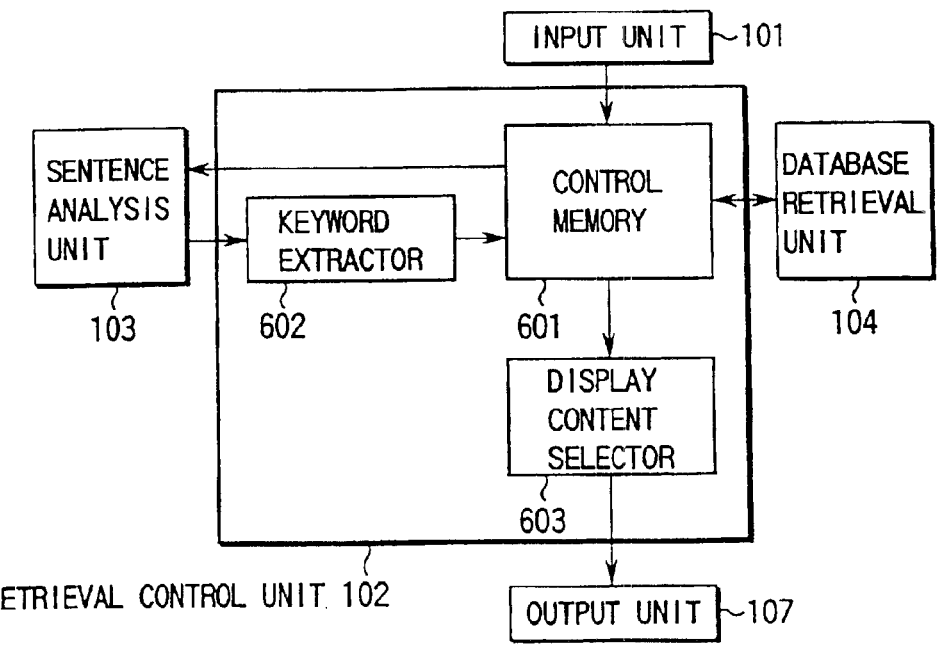

FIG. 5

| ENTRY NUMBER | NUMBER OF OCCURRENCE OF KEYWORD | WORD MEANING DATA |
|---|---|---|
| 1 | 0 | WORD MEANING 1 |
| 2 | 0 | WORD MEANING 2 |
| 3 | 0 | WORD MEANING 3 |
FIG. 8
| ENTRY NUMBER | NUMBER OF OCCURRENCE OF KEYWORD | WORD MEANING DATA |
|---|---|---|
| 1 | 0 | WORD MEANING 1 |
| 2 | 1 | WORD MEANING 2 |
| 3 | 0 | WORD MEANING 3 |
FIG. 9
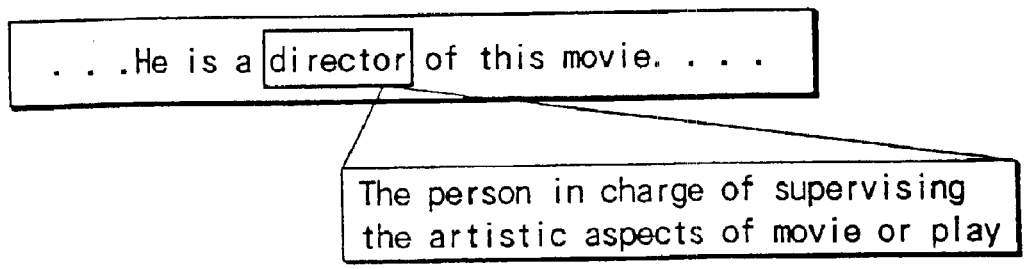
FIG. 10
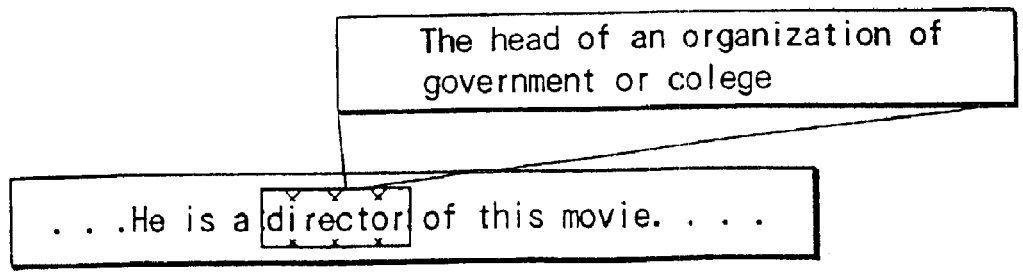
FIG. 11

.....He is a |director| of Jurassic World......

| WORD ORDER | HEADWORD | A PART OF SPEECH |
|---|---|---|
| 0 | he | PRONOUN |
| 1 | be | VERB |
| 2 | a | DETERMINER |
| 3 | director | NOON |
| 4 | of | PREPOSITION |
| 5 | Jurassic World | PROPER NOUN | search ((headword:Jurassic World)(properties:director)

FIG. 20

<headword>Jurassic World<\headword>
<year of publication>1993<\year of publication>
<producer>Jacqueline・○○○○○<\producer>
<director>Steve・○○○○○<\director>
<actor/actress1>Tom・○○○○○<\actor/actress1>
<actor/actress2>Charlie・○○○○○<\actor/actress2>
<explanation>near-future.dinosaur reproduced by
gene engineering. . .<\explanation>

FIG. 21

| ENTRY NUMBER | NUMBER OF OCCURRENCE OF KEYWORD | WORD MEANING DATA |
|---|---|---|
| 1 | 0 | WORD MEANING 1 |
| 2 | 1 | WORD MEANING 2 |
| 3 | 0 | WORD MEANING 3 |

INFORMATION RETRIEVAL APPARATUS AND INFORMATION RETRIEVAL METHOD

This application is a Division of application Ser. No. 09/161,383 filed on Sep. 28, 1998, now U.S. Pat. No. 6,442,540.

BACKGROUND OF THE INVENTION

The present invention relates to an information retrieval apparatus wherein a given word or phrase is designated in an electronic-format document (herein-after referred to as simply "document"), novel and high-level information retrieval is performed from database on the basis of the designated content, thus providing the user with useful information.

With recent development in miniaturization of computers and prevalence of Internet, formation and inspection of documents have been done electronically with rapid progress. In addition, software for enabling users to rewrite or polish sentences or consult dictionaries on computers have already been put to practical use.

For example, the following service is available to the user who prepares documents or inspect documents by using dictionary retrieval software including a dictionary database stored in CD-ROM, etc.

If the user provides a character sequence of a given word or phrase to the dictionary retrieval software as a retrieval character sequence, data retrieval is effected from the dictionary database stored in the CD-ROM, etc. and detailed information relating to the designated word or phrase can be obtained.

In the prior-art information retrieval using the dictionary retrieval software, etc., the retrieval result is presented to the user after the retrieval from the dictionary database is completed. All retrieval result including information, which is not needed by the user in view of the contents of the currently processed document, is presented to the user as it is.

Consequently, the user has to manually search the great deal of retrieval result in order to acquire his/her desired information. This is very inconvenient to the user.

BRIEF SUMMARY OF THE INVENTION

The present invention has been made in consideration of the above circumstances, and its object is to provide an information retrieval apparatus wherein if a number of retrieval results are acquired by searching a database, the user can quickly obtain a proper retrieval result and is not required to choose his/her desired information from the retrieval results, and thus a work load on the user can be reduced.

According to the present invention, there is provided an information retrieval apparatus comprising: input means for inputting a document; designation means for designating a desired character sequence in the document input by the input means; retrieval means for searching a database on the basis of the character sequence designated by the designation means and acquiring a plurality of retrieval results; sentence cutting-out means for cutting out a sentence associated with the character sequence designated by the designation means, from the document input by the input means; sentence analysis means for analyzing the sentence cut out by the sentence cutting-out means; keyword generating means for generating a keyword from a sentence analysis result acquired by the sentence analysis means; calculation means for calculating an evaluation value of each of the retrieval results obtained by the retrieval means, with use of the keyword generated by the keyword generating means; and selection means for selecting a predetermined one of the retrieval results on the basis of the evaluation values calculated by the calculation means.

The retrieval results are not presented as they are. Only a retrieval result which is considered to be sought by the user is selected and presented. Alternatively, if all retrieval results are to be presented, they are presented in such a manner that a retrieval result which is considered to be sought by the user may be recognized by the user. Accordingly, the user can acquire his/her desired information with high efficiency. In other words, the information desired by the user is presented without the user sifting retrieval results by him/herself. Therefore, the understanding of the sentences is facilitated, and the load on the user can be reduced, as compared to the prior art.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 4 shows an example of a retrieval result of a dictionary of the English language;

FIG. 5 is a block diagram showing a structure of a retrieval control unit;

FIG. 8 shows an example of a keyword number table (in the initial state);

FIG. 9 shows an example of a keyword number table (in the final state);

FIG. 10 shows an example of a display image of the retrieval result;

FIG. 11 shows another example of the display image of the retrieval result;

FIG. 20 shows an example of a retrieval condition;

FIG. 21 shows an example of a cinema dictionary retrieval result;

DETAILED DESCRIPTION OF THE INVENTION

Embodiments of an information retrieval apparatus according to the present invention will now be described with reference to the accompanying drawings.

(First Embodiment)

Figures 1, 2, 3:
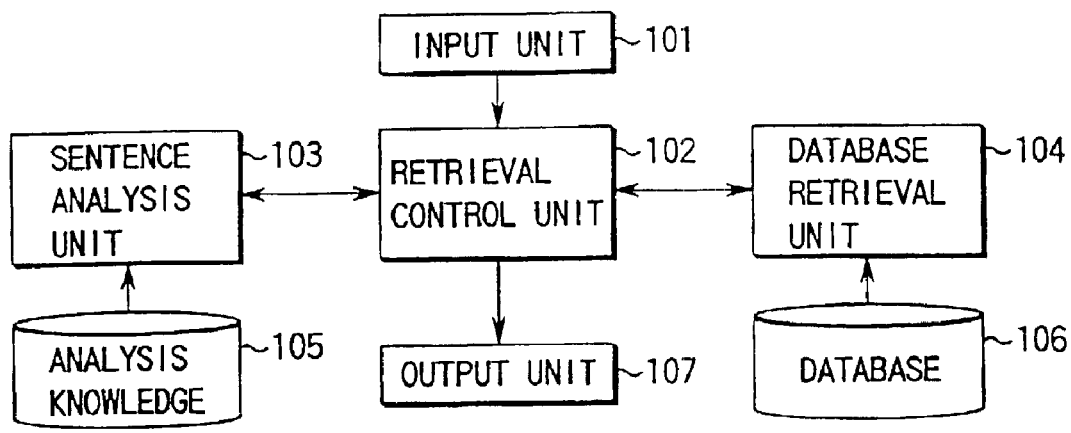
FIG. 1 is a block diagram showing a schematic structure of an information retrieval apparatus according to an embodiment of the present invention.
FIG. 2 shows an example of a display image of a document.
FIG. 3 shows an example of a morphological analysis result of a sentence to be analyzed.

FIG. 1 is a block diagram showing a schematic structure of an information retrieval apparatus according to a first embodiment of the invention. The information retrieval apparatus, as shown in FIG. 1, comprises an input unit 101, a retrieval control unit 102, a sentence analysis unit 103, a database retrieval unit 104, an analysis knowledge 105, a database 106 and an output unit 107.

The input unit 101 constitutes input means for inputting a document. Specifically, the input unit 101 comprises one or more of, e.g. a keyboard (key input), a recording medium drive unit (data read from a recording medium such as a magnetic disk, a magnetic tape or an optical disk), an OCR (optical character reader), and a network connector unit (data acquisition by network communication). When the OCR is used, a function of character-recognizing a read character image to generate a code sequence is used.

In addition, the input unit 101 constitutes instruction means with which the user instructs a word or phrase to be retrieved in an input document or instructs selection of retrieved display information.

A keyboard or a mouse, for example, is used for the user to input instructions.

The document data input from the input unit 101 is temporarily stored in a memory (not shown) in the retrieval control unit 102. Then, if retrieval of given character data (word or phrase) in the displayed document is instructed through the input unit 101, a predetermined portion of the document data (e.g. one sentence including the character data, the retrieval of which was instructed, or two or more sentences including this sentence) is delivered to the sentence analysis unit 103.

The character data, the retrieval of which was instructed by the input unit 101, is input to the database retrieval unit 104 through the retrieval control unit 102.

Under the control of the retrieval control unit 102, the sentence analysis unit 103 receives the character data from the retrieval control unit 102, performs sentence analysis with use of the analysis knowledge 105, and outputs an analysis result. The method of sentence analysis may be a general one, for example, morphological analysis, parsing, or semantic analysis.

Under the control of the retrieval control unit 102, the database retrieval unit 104 receives the character data from the retrieval control unit 102, searches the database 106 and outputs a retrieval result.

The retrieval control unit 102 utilizes the sentence analysis result by the sentence analysis unit 103 and the retrieval result of the database 106 by the database retrieval unit 104, and selects the data sought by the user and delivers it to the output unit 107.

The output unit 107 is a means for presenting the input document or retrieval result to the user. The output unit 107, for example, comprises either or both of an optical display and a printer.

The operation of the first embodiment with the above structure will now be described.

Suppose that a document has already been input and displayed. The user designates through the input unit 101 a given character sequence (hereinafter "retrieval character sequence") in the document, on which the user wishes to have detailed information.

For example, FIG. 2 shows a display screen displaying a document ". . . He is a director of this movie . . . " Suppose that the user has designated the character sequence "director" on this screen by dragging this sequence, using the input unit 101 such as a mouse.

The retrieval control unit 102 cuts out one sentence including the retrieval character sequence designated by the user with use of position data, etc., and delivers it to the sentence analysis unit 103. In addition, the retrieval control unit 102 sends the retrieval character sequence to the database retrieval unit 104.

In the example in FIG. 2, one sentence including the retrieval character sequence "director", i.e. "He is a director of this movie.", is cut out and sent to the sentence analysis unit 103. In addition, the retrieval character sequence "director" is sent to the database retrieval unit 104.

The sentence analysis unit 103 performs an analysis process on the sentence delivered from the retrieval control unit 102 by making use of the analysis knowledge 105 and delivers the analysis result to the retrieval control unit 102. The analysis process in this context refers to one or more of morphological analysis, parsing and semantic analysis. A description will now be given of a case where the sentence analysis unit 103 performs the analysis process based on the morphological analysis. FIG. 3 shows an example of an analysis result of the morphological analysis performed on the sentence "He is a director of this movie."

The database retrieval unit 104 retrieves desired data from the database 106 on the basis of the retrieval character sequence "director" input from the retrieval control unit 102, and delivers it to the retrieval control unit 102.

Suppose that the database 106 is a dictionary of the English language as shown in FIG. 4. Using the retrieval character sequence "director" delivered from the retrieval control unit 102, the database retrieval unit 104 retrieves three word meanings:

"the head of an organization or government or college",

"the person in charge of supervising the artistic aspects of movie or play", and "a member of a governing board to whom the overall direction of a company is left".

In FIG. 4 the portion interposed between "<" and ">" is a tag.

The portion between "<headword>" and "<\headword>" is a headword in the dictionary. The headword in this example is "director".

Information on a part of speech follows the headword. The part of speech in this example is "noun".

Following the above, the word meanings of the headword are described. There are three word meanings: <wordmeaning1>, <wordmeaning2> and <wordmeaning3>.

In this embodiment, the processing by the sentence analysis unit 103 and the processing by the database retrieval unit 104 may be executed in parallel, or one of them may be first executed.

A retrieval result from the sentence analysis unit 103 and a retrieval result from the database retrieval unit 104 are returned to the retrieval control unit 102 and the content to be displayed to the user is selected.

FIG. 5 shows an example of the structure of the retrieval control unit 102 in the first embodiment. As is shown in FIG. 5, the retrieval control unit 102 comprises a control memory 601, a keyword extractor 602 and a display content selector 603.

The control memory 601 is associated with a general control for retrieval, and specifically stores a document input from the input unit 101, sends a retrieval instruction from the user to the database retrieval unit 104, and delivers a cut-out sentence to the sentence analysis unit 103.

The keyword extractor 602 extracts from the analysis result delivered from the sentence analysis unit 103 a keyword effective for selecting the display content, prepares a keyword list and sends it to the control memory 601. The control memory 601 delivers to the display content selector 603 the keyword list and the retrieval result (see FIG. 4) from the database retrieval unit 104.

Figure 6:
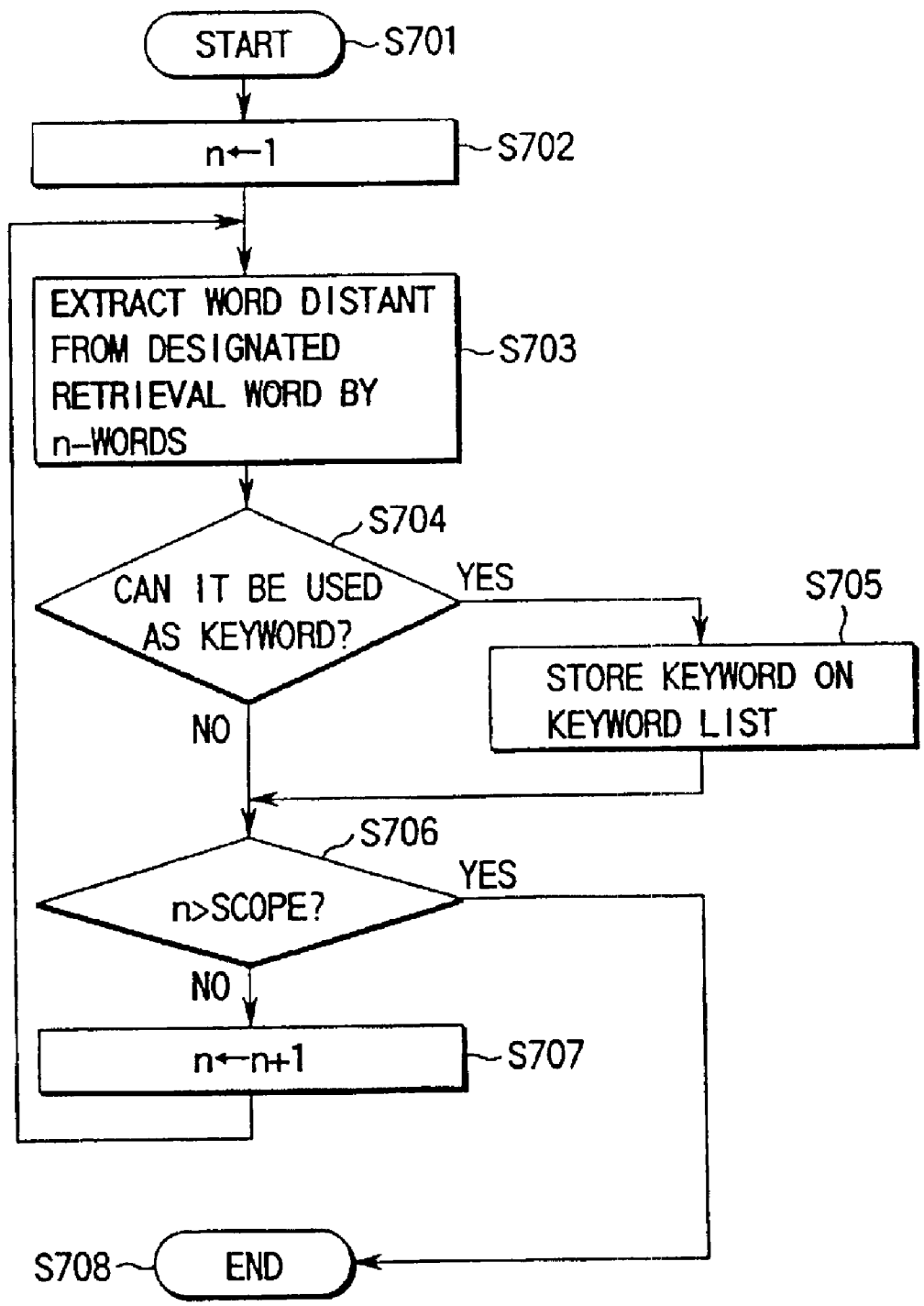
FIG. 6 is a flow chart showing an example of a procedure of a keyword extraction process utilizing a morphological analysis result.

FIG. 6 shows an example of the procedure of the keyword list preparing process in the keyword extractor 602.

At first, a variable n is set at 1 (step S702). This value is a variable representing a distance from the retrieval character sequence ("director" in FIG. 3). The distance in this context is the number of words as counted from the retrieval character sequence.

As regards the morphological analysis result, it is determined whether the analyzed words can be used as keyword on a word-by-word basis (steps S703 and S704). The keyword in this context refers to a word for sifting retrieval results. The keyword is a word which is extracted on the basis of the designated retrieval character sequence, while using, as a key, information on a part of speech such as a noun or a proper noun, or a field information such as a computer-field term or a economics-field term. In this example, the key for keyword extraction is "noun". The keyword is stored on a keyword list (step S705).

It is determined whether the variable n exceeds a scope (step S706). The scope in this context is a value representing the limit number of words for keyword extraction, as counted from the retrieval character sequence. For example, if the scope is 5, the keyword extraction is performed in a scope covering five words before and five words after the designated retrieval character sequence.

For example, in this embodiment, the scope is set at 3. If the number of words does not exceed the scope, n is incremented by 1 (step S707) and the keyword retrieval is performed once again. If the number of words exceeds the scope, the search for all words within the scope is completed and the process is finished (step S708). The processing result or the keyword list is delivered to the display content selector 603. If no keyword is extracted, a keyword list showing no keyword is delivered to the display content selector 603.

According to the above process, for example, if the morphological analysis result shown in FIG. 3 is input, the noun "movie" is extracted as keyword and registered on the keyword list, and the keyword list is delivered to the display content selector 603.

The display content selector 603 receives the keyword list delivered from the keyword extractor 602 and the retrieval result from the database retrieval unit 104, and calculates an evaluation point for the retrieval results in order to select the display content. The retrieval result with the highest evaluation point is delivered to the output unit 107.

Figure 7:
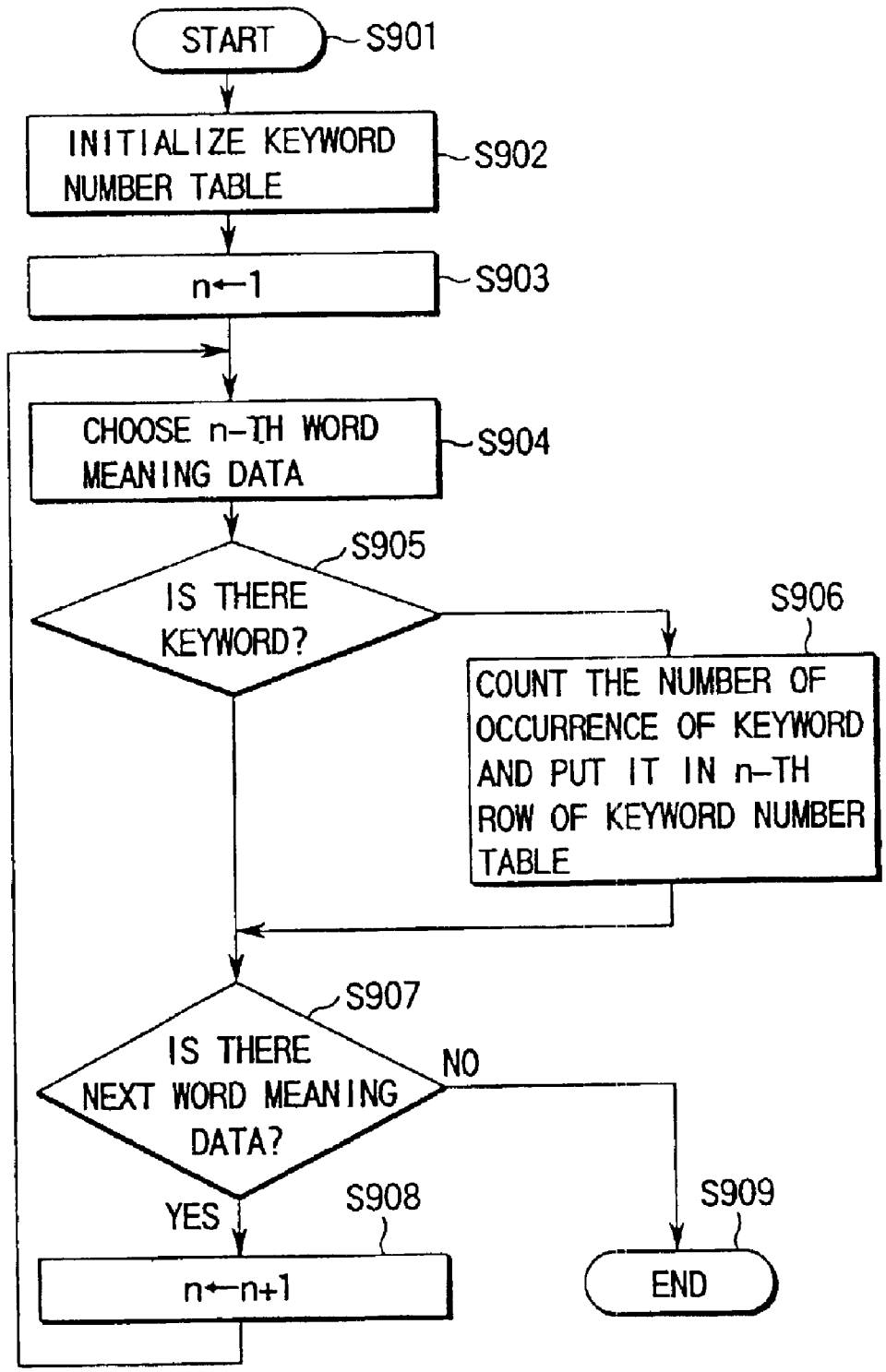
FIG. 7 is a flow chart showing an example of a process for selecting display information.

FIG. 7 shows an example of the procedure of the display content selection process. In this example, the number of occurrence of keyword is counted on the basis of the word meanings. The word meaning with the highest evaluation point is displayed to the user.

Suppose that the display content selector 603 has received the retrieval result shown in FIG. 4 and the keyword list "movie" from the control memory 601.

At first a keyword number table is initialized (step S902). The keyword number table is a table for storing the number of occurrence of keyword in the word meaning data of the retrieval results. The keyword number table has rows, the number of which is equal to the number of word meaning data items.

When the retrieval results shown in FIG. 4 have been received, the retrieval results include three word meaning data items. Thus, as shown in FIG. 3, the number of rows in the keyword number table is three in accordance with the number of word meanings.

Then, a variable n is set at 1 (step S903). This value represents an entry number of word meaning data.

The contents of the word meaning data are examined as to whether the keyword on the keyword list is included (steps S904 and S905). If the keyword is included, the number of occurrence of keyword is counted and the count value is put in the row of the keyword number table associated with the word meaning data (step S906).

It is then determined whether the next word meaning data is present in the keyword number table (step S907). If it is present, n is incremented by 1 (step S908) and a keyword search in the word meaning data is performed once again. If there is no word meaning data, the process is finished (step S909).

Since the keyword "movie" is not present in the first word meaning data, value 0 is put in the first row of the keyword number table, as shown in FIG. 9.

Since the word "movie" occurs once in the second word meaning data, value 1 is put in the second row of the keyword number table (step S906).

Similarly, the number of occurrence of keyword is counted for each word meaning data item. In this example, the second word meaning data with the highest number of occurrence is selected.

In other words, the word meaning data with the highest number of occurrence of keywords is selected on the basis of the keyword number table. This word meaning data is sent to the output unit 107 and displayed as a dictionary retrieval result.

The output unit 107 shows the dictionary retrieval result, for example, as shown in FIG. 10.

In the display mode shown in FIG. 10, only data most associated with the retrieval character sequence is displayed. However, other display modes may be adopted. For example, if a popped-up display screen is clicked by means of a mouse, etc., the other word meaning data items (e.g. first and third word meaning data items in FIG. 4) may be displayed as secondary candidates. In this case, it is preferable to determined the order of priority of candidates in accordance with the number of occurrence of keyword or the order of increase/decrease of entry numbers.

FIG. 11 shows an example of a display image in a case where the user instructed display of the next candidate. The next candidate shown in FIG. 11 is determined in such an order of priority that the candidate with a lowest entry number first displayed.

Figure 12:
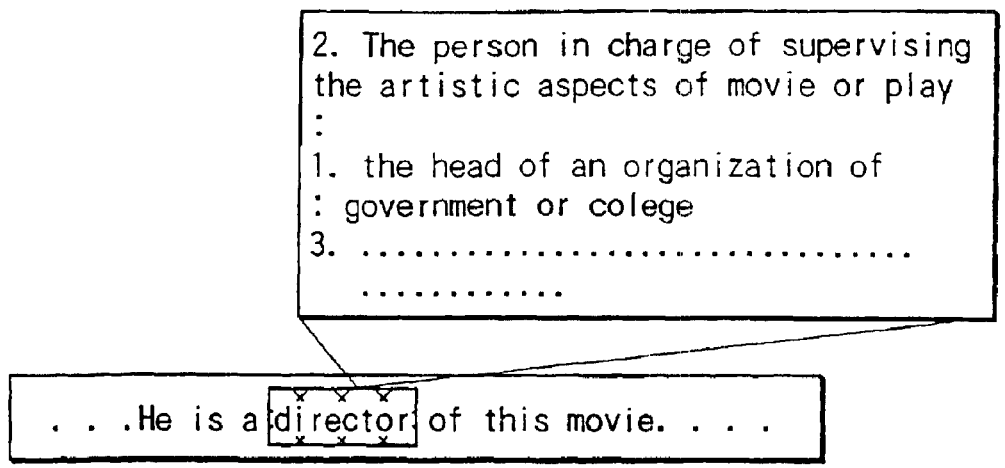
FIG. 12 shows another example of the display image of the retrieval result.

As is shown in FIG. 12, all retrieval results may be rearranged and displayed, instead of selecting one of retrieval results. As a matter of course, the rearrangement in this case is based on the number of occurrence of keyword.

In this embodiment, the scope is set on the basis of the number of words as counted from the retrieval word, and this scope is employed as a keyword search scope. However, the scope may be freely chosen, for example, on the basis of a summary representing the same content, the beginning of a passage, or a cut-out sentence. If no keyword is present in a cut-out sentence, the scope may be reset at a sentence before or after the cut-out sentence. In this manner, the keyword search method may be properly modified.

Figure 13:
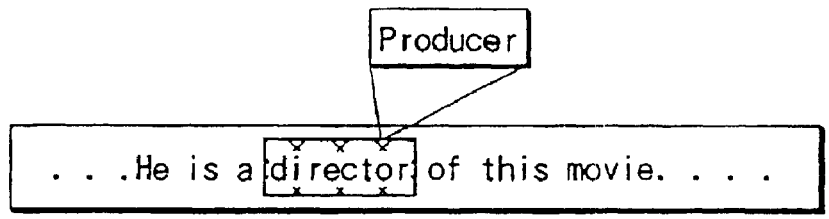
FIG. 13 shows another example of the display image of the retrieval result.

The database 106 may be a desired one. For example, if the database 106 is a thesaurus, a synonym of "director" may be chosen and displayed, as shown in FIG. 13.

As has been described above, according to the first embodiment, the retrieval results are not presented as they are. Only a retrieval result which is considered to be sought by the user is selected and presented. Alternatively, if all retrieval results are to be presented, they are presented in such a manner that a retrieval result which is considered to be sought by the user may be recognized by the user. Accordingly, the user can acquire his/her desired information with high efficiency. In other words, the information desired by the user is presented without the user sifting retrieval results by him/herself. Therefore, the understanding of the sentences is facilitated, and the load on the user can be reduced, as compared to the prior art.

(Second Embodiment)

A second embodiment of the information retrieval apparatus of the invention will now be described.

In the first embodiment the morphological analysis is adopted as analysis method in the sentence analysis unit 103. In the second embodiment, parsing is adopted as the analysis method.

The information retrieval apparatus of the second embodiment will now be described mainly with respect to points differing from the first embodiment.

The processing associated with the input of retrieval instruction by the user and the processing by the database retrieval unit 104 are common to those in the first embodiment.

Figure 14:
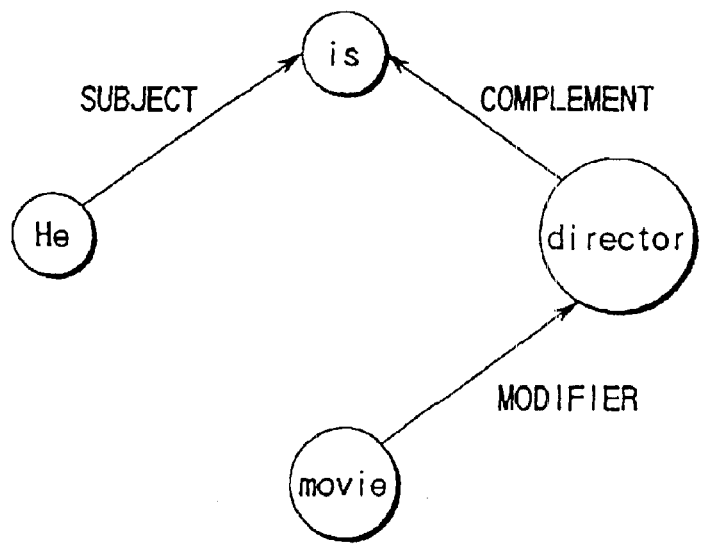
FIG. 14 shows an example of a parsing result of a sentence to be analyzed.

FIG. 14 shows an example of an analysis result by the sentence analysis unit 103 to which the parsing is applied.

Specifically, the keyword extractor 602 of the retrieval control unit 102 in the information retrieval apparatus of the second embodiment executes the parsing process and outputs, as an analysis result, data representing a concept dependency structure as shown in FIG. 14.

Figure 15:
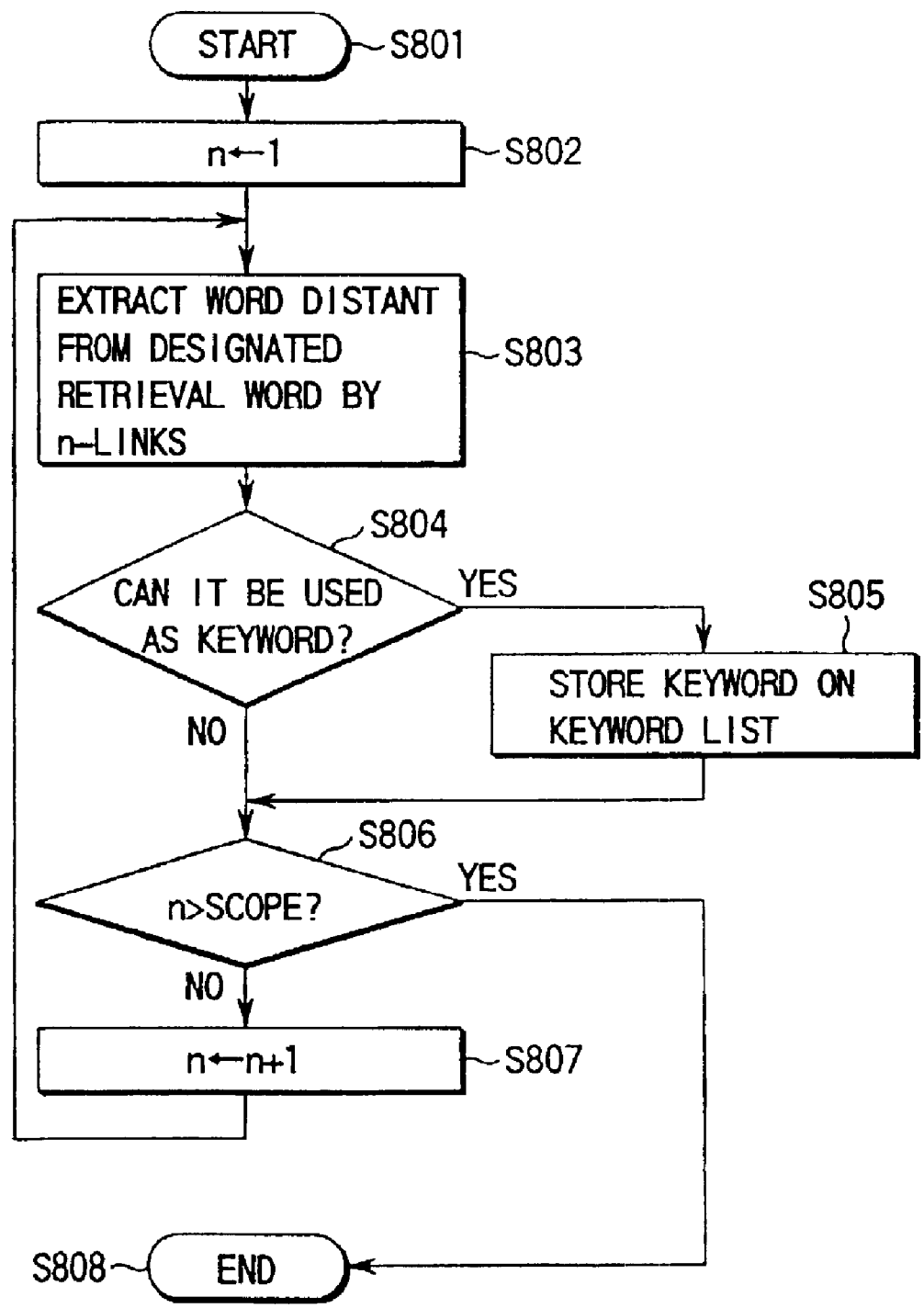
FIG. 15 is a flow chart showing an example of a procedure of a keyword extraction process utilizing a parsing result.

FIG. 15 shows an example of the process procedure of the keyword extractor 602 in the retrieval control unit 102 in a case where the parsing result is utilized.

At first a variable n is set at 1 (step S802). This variable n represents a distance from a node of a retrieval character sequence. The distance in this context is a value indicating the number of actions following links as counted from the node of the retrieval character sequence. In FIG. 14, a node "movie" or "is" is distant from a node "director" by one link. A node "He" is distant from the node "director" by two links.

As regards the parsing result, it is determined whether the analyzed words can be used as keyword on a word-by-word basis (steps S803 and S804). The keyword in this context refers to a word for sifting retrieval results. The keyword is a word which is extracted on the basis of the designated retrieval character sequence, while using, as a key, information on a part of speech such as a noun or a proper noun, or a field information such as a computer-field term or a economics-field term. In this example, the key for keyword extraction is "noun". The keyword is stored on a keyword list (step S805).

It is determined whether the variable n exceeds a scope (step S806). The scope in this context is a value representing how far a node to be used for key word is distant from the node of the retrieval character sequence. For example, if the scope is 5, the keyword extraction is performed in a scope covering nodes which are distant from the node of the retrieval character sequence by value 5. In this embodiment, the scope is set at 2. If the number of links does not exceed the scope, n is incremented by 1 (step S807) and the keyword retrieval is performed once again. If the number of words exceeds the scope, the search for all words within the scope is completed and the process is finished. The processing result or the keyword list is delivered to the display content selector 603. If no keyword is extracted, a keyword list showing no keyword is delivered to the display content selector 603.

According to the above process, for example, if the parsing result shown in FIG. 14 is input, the word "movie" is extracted as keyword and registered on the keyword list, and the keyword list is delivered to the display content selector 603.

Subsequently, as in the first embodiment, the display content selector 603 selects data to be presented, on the basis of the keyword list delivered from the keyword extractor 602 and the retrieval result from the database retrieval unit 104, and a dictionary retrieval result is displayed by the output unit 107, for example, as shown in FIG. 10.

In the first embodiment the morphological analysis is adopted as sentence analysis method, while in the second embodiment the parsing is adopted. The present invention, however, is not limited to these analysis methods. For example, sentence analysis may be performed on the basis of simple keyword retrieval. Although the dictionary of the English language is used as a database in the above embodiments, a borrowed-word dictionary, a new-word dictionary or an English-Japanese dictionary, for example, may be substituted.

(Third Embodiment)

A third embodiment of the information retrieval apparatus according to the invention will now be described.

In the first and second embodiments, a plurality of retrieval results are acquired by searching the database 106 on the basis of the designated word or phrase, and a proper one of the retrieval results is selected by using a keyword extracted from the sentence analysis result.

In the information retrieval apparatus of the third embodiment, a retrieval condition is generated on the basis of the keyword (primary retrieval condition) extracted from the sentence analysis result and the designated word or phrase (secondary retrieval condition). Using the retrieval condition, the database 106 is searched. In this respect, the processing in the retrieval control unit 102 in the third embodiment differs from that in the first embodiment. The other processing, however, is substantially the same as in the first embodiment.

The information retrieval apparatus of the third embodiment will now be described mainly with respect to points differing from the first embodiment.

The schematic structure of the information retrieval apparatus of this embodiment is the same as that of the first embodiment. Specifically, as shown in FIG. 1, the information retrieval apparatus, as shown in FIG. 1, comprises an input unit 101, a retrieval control unit 102, a sentence analysis unit 103, a database retrieval unit 104, an analysis knowledge 105, a database 106 and an output unit 107.

The document data input from the input unit 101 is temporarily stored in a memory (not shown) in the retrieval control unit 102.

If retrieval of given character data (word or phrase) in the displayed document is instructed through the input unit 101, a predetermined portion of the document data (e.g. one sentence including the character data, the retrieval of which was instructed, or two or more sentences including this sentence) is delivered to the sentence analysis unit 103.

Under the control of the retrieval control unit 102, the sentence analysis unit 103 receives the character data from the retrieval control unit 102, performs sentence analysis with use of the analysis knowledge 105, and outputs an analysis result. The method of sentence analysis may be a general one, for example, morphological analysis, parsing, or semantic analysis.

The retrieval control unit 102 prepares a retrieval condition for acquiring data sought by the user by making use of the character data, retrieval of which was instructed from the input unit 101, and the sentence analysis result delivered from the sentence analysis unit 103. The retrieval control unit 102 delivers the prepared retrieval condition to the database retrieval unit 104 and instructs the retrieval.

Under the control of the retrieval control unit 102, the database retrieval unit 104 receives the retrieval condition from the retrieval control unit 102, searches the database 106 and outputs a retrieval result.

The retrieval control unit 102 delivers to the output unit 107 the retrieval result of the database 106 by the database retrieval unit 104.

The operation of the third embodiment will now be described in detail with reference to a specific example.

Suppose that a document has already been input. The user designates through the input unit 101 a given character sequence (i.e. "retrieval character sequence") on which the user seeks detailed information.

Figures 16, 17, 18:
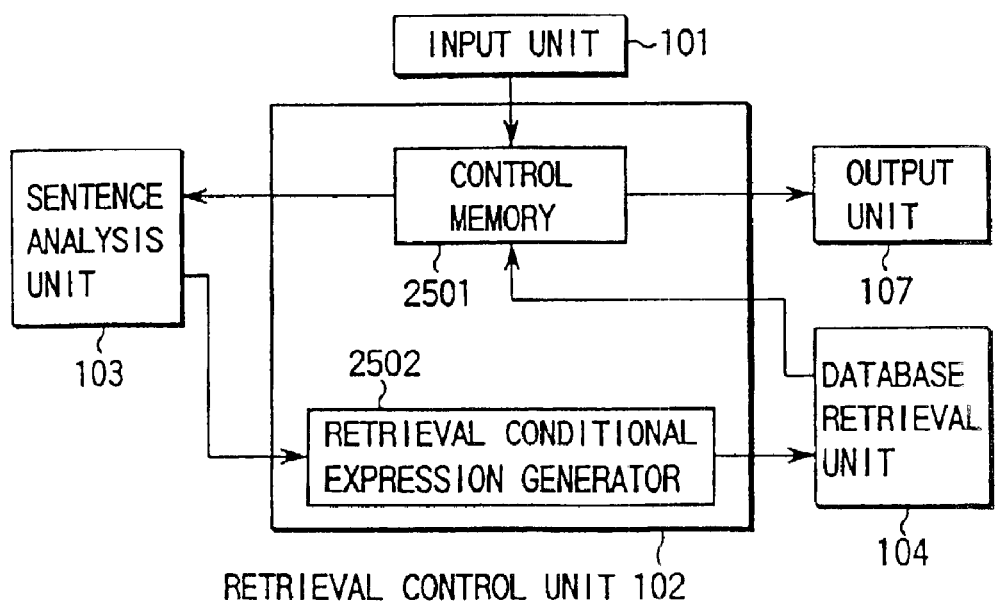
FIG. 16 shows an example of a display image of the document.
FIG. 17 shows an example of a parsing result of a sentence to be analyzed.
FIG. 18 is a block diagram showing a structure of a retrieval control unit.

For example, FIG. 16 shows a display screen displaying a document ". . . He is a director of Jurassic World . . . ." Suppose that the user has designated the character sequence "director" on this screen by dragging this sequence, using an input device such as a mouse, and has instructed that detailed information on "director" is sought. In addition, suppose that "Jurassic World" is a proper noun meaning a title of movie.

The retrieval control unit 102 cuts out one sentence including the retrieval character sequence designated by the user with use of position data, etc., and delivers it to the sentence analysis unit 103.

In the example in FIG. 16, one sentence including the retrieval character sequence "director", i.e. "He is a director of Jurassic World", is cut out and sent to the sentence analysis unit 103.

The sentence analysis unit 103 performs an analysis process on the sentence delivered from the retrieval control unit 102 by making use of the analysis knowledge 105 and delivers the analysis result to the retrieval control unit 102. The analysis process in this context refers to one or more of morphological analysis, parsing and semantic analysis. Like the first embodiment, a description will now be given of a case where the sentence analysis unit 103 performs the analysis process based on the morphological analysis. FIG. 17 shows an example of an analysis result of the morphological analysis performed on the sentence "He is a director of Jurassic World".

The retrieval control unit 102 prepares a retrieval condition by using the analysis result from the sentence analysis unit 103 and the retrieval character sequence, and sends the retrieval condition to the database retrieval unit 104.

FIG. 18 is a block diagram showing an example of the structure of the retrieval control unit 102 in this embodiment. As is shown in FIG. 18, the retrieval control unit 102 comprises a control memory 2501 and a retrieval condition generator 2502.

The control memory 2501 is associated with a general control for retrieval, and specifically stores a document input from the input unit 101, receives a retrieval instruction from the user, cuts out one sentence and sends it to the sentence analysis unit 103, and delivers a retrieval result of the database to the output unit 107.

The retrieval condition generator 2502 extracts a keyword effective for searching the dictionary from the analysis result of the sentence analysis unit 103, prepares a retrieval condition and sends it to the database retrieval unit 104.

Figure 19:
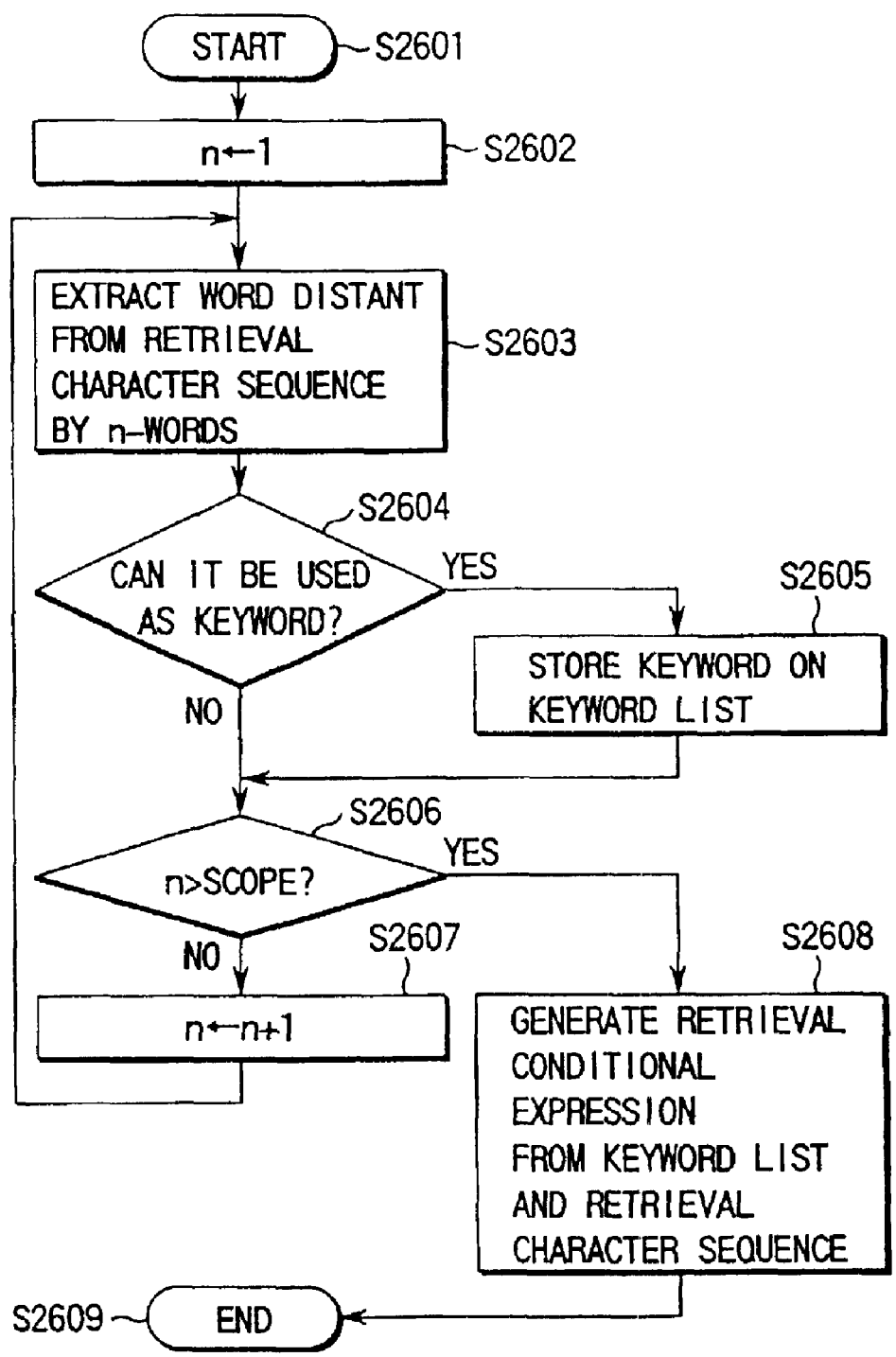
FIG. 19 is a flow chart showing an example of a procedure of a keyword extraction process utilizing a morphological analysis result.

FIG. 19 shows an example of the procedure for preparing the retrieval condition by the retrieval condition generator 2502.

At first, a variable n is set at 1 (step S2602). A word distant from the retrieval character sequence ("director" in FIG. 17) by n-words (i.e. distance) is extracted (step S2603).

As regards the morphological analysis result, it is determined whether the analyzed words can be used as keyword on a word-by-word basis (steps S2604).

The keyword in this context refers to a word for sifting retrieval results. The keyword is a word which is extracted on the basis of the designated retrieval character sequence, while using, as a key, information on a part of speech such as a noun or a proper noun, or a field information such as a computer-field term or a economics-field term. In this example, the key for keyword extraction is "proper noun". The keyword is stored on a keyword list (step S2605).

It is determined whether the variable n exceeds a scope (step S2606). The scope in this context is a value representing the number of words for keyword extraction, as counted from the retrieval character sequence. For example, if the scope is 5, the keyword extraction is performed in a scope covering five words before and five words after the retrieval character sequence. In this embodiment, the scope is set at 3. If the number of words does not exceed the scope, n is incremented by 1 (step S2607) and the keyword retrieval is performed once again. If the number of words exceeds the scope, the retrieval condition is generated on the basis of the keyword list and the retrieval character sequence (step S2608), and the process is finished (step S2609). The retrieval condition is delivered to the database retrieval unit 104. The method of preparing the retrieval condition on the basis of the keyword list and retrieval character sequence may be a conventional one.

According to the above process, for example, if the morphological analysis result shown in FIG. 17 is input, the word "Jurassic World" is extracted as keyword, and the retrieval condition for retrieving the retrieval character sequence "director" and "director of Jurassic World" is prepared, as shown in FIG. 20.

The database retrieval unit 104 retrieves desired data from the database by using the retrieval condition delivered from the retrieval control unit 102, and delivers it to the retrieval control unit 102.

Suppose that the database 106 is a cinema dictionary as shown in FIG. 21. Information on "Jurassic World" is retrieved according to the retrieval condition, shown in FIG. 20, delivered from the retrieval control unit 102. Since "director" is requested as properties in the conditional expression, a character sequence "Steve·○○○○○" is retrieved.

As regards the data in FIG. 21, portions in "< >" are tags. For example, the portion between "headword" and "\headword" is a headword in the dictionary. In this example, the headword in the dictionary is "Jurassic World". Following this, the year of publication associated with the headword appears. In this example, it is indicated that "Jurassic World" was published in 1993. Then, the producer and direction associated with the headword are described. An explanation of the described contents may be omitted. For example, "Steve·○○○○○" denotes the name of a person.

Figure 22:
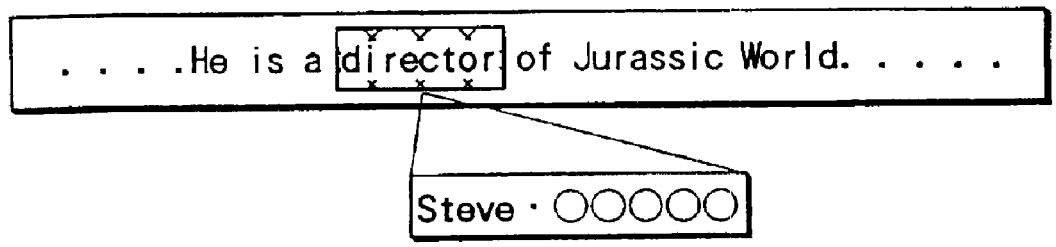
FIG. 22 shows an example of a display image of a retrieval result.

The retrieved character sequence is sent to the output unit 107 via the retrieval control unit 102, and a dictionary retrieval result is displayed. For example, as shown in FIG. 22, an output device of the output unit 107 displays the dictionary retrieval result to the user.

In the above-described embodiment, the retrieval condition is prepared on the basis of the keyword list and retrieval character sequence, the database is searched according to the retrieval condition, and the acquired retrieval result is presented. Instead of this, however, it is possible that the retrieval condition is prepared on the basis of the keyword list, the database is searched according to this retrieval condition, and one of acquired retrieval results, which corresponds to the retrieval character sequence, is selectively presented.

(Fourth Embodiment)

A fourth embodiment of the information retrieval apparatus according to the invention will now be described.

In the third embodiment the morphological analysis is adopted as analysis method in the sentence analysis unit 103. In the fourth embodiment, parsing is adopted as the analysis method.

The information retrieval apparatus of the fourth embodiment will now be described mainly with respect to points differing from the third embodiment.

If a retrieval instruction is input by the user, one sentence including the retrieval character sequence "director", i.e. "He is a director of Jurassic World", is cut out and sent to the sentence analysis unit 103, as in the first embodiment.

Figure 23:
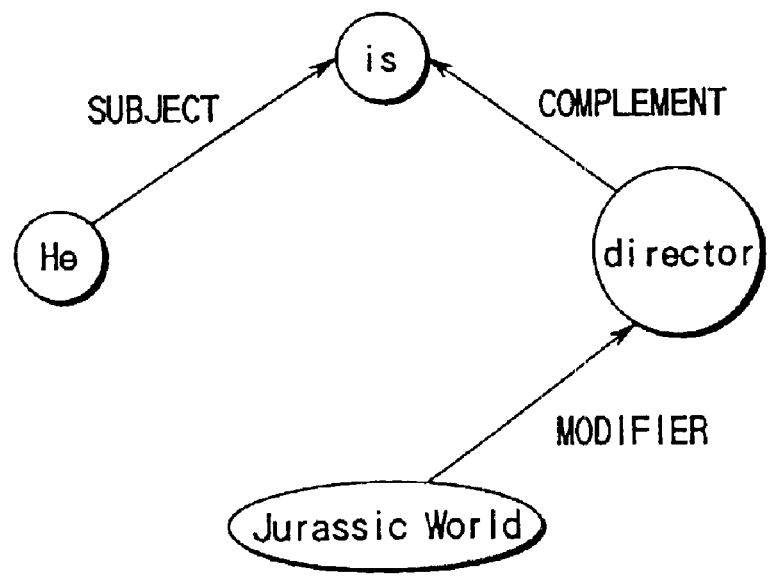
FIG. 23 shows an example of a parsing result of a sentence to be analyzed.
Figure 24:
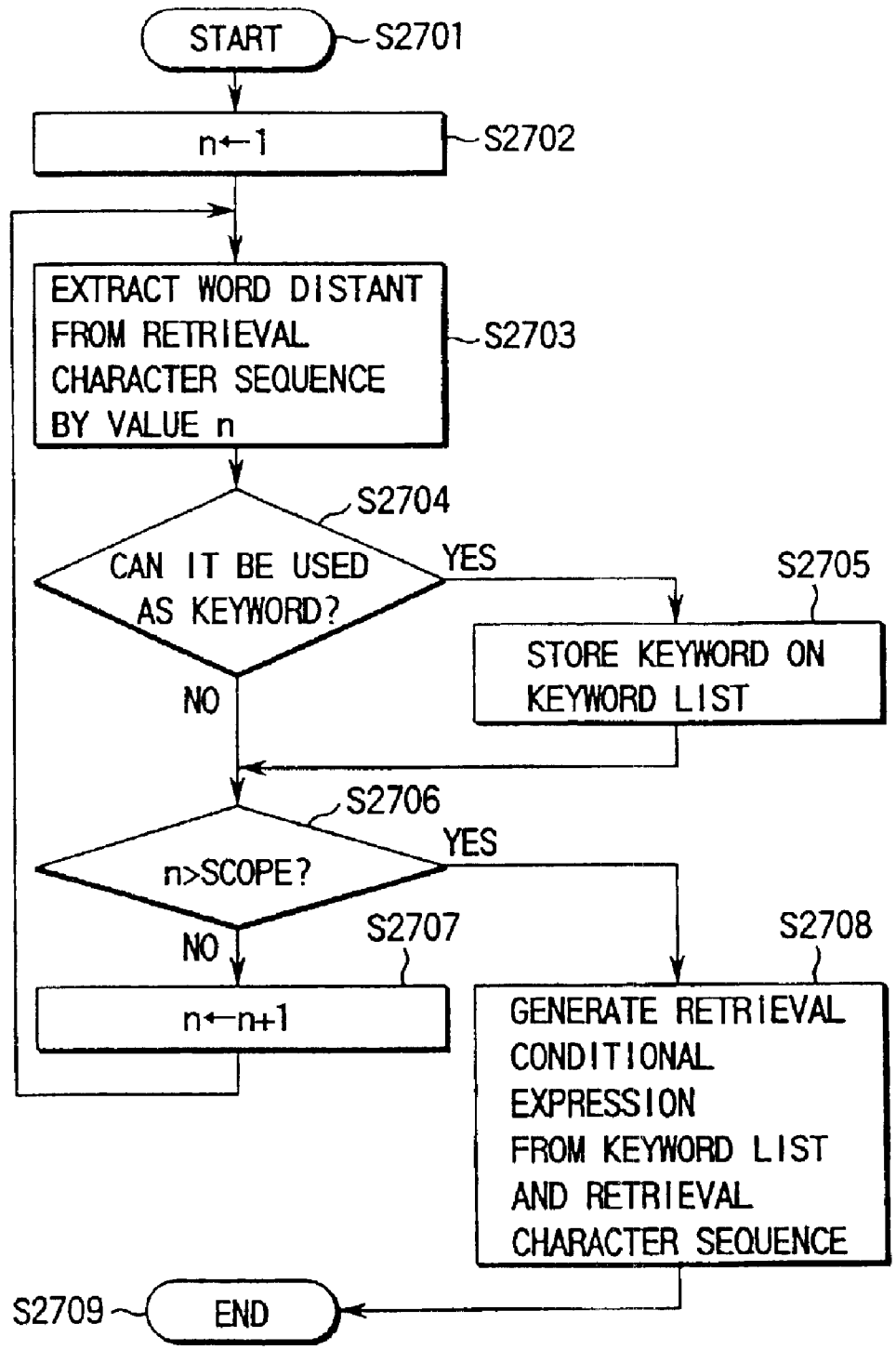
FIG. 24 is a flow chart illustrating an example of a procedure of a keyword extraction process utilizing a parsing result.

FIG. 23 shows an example of the analysis result by the sentence analysis unit 103 to which the parsing method is applied. Specifically, the retrieval condition generator 2502 of the retrieval control unit 102 in the information retrieval apparatus of the fourth embodiment executes the parsing process and outputs, as an analysis result, data representing a concept dependency structure as shown in FIG. 23.

At first a variable n is set at 1 (step S2702).

The value n indicating the number of links as counted from the retrieval character sequence is extracted (step S2703). The value n represents the distance from the node of the retrieval character sequence. Specifically, in FIG. 23, the distance of node "Jurassic World" or "is" from node "director" is 1, and the distance of node "He" from node "director" is 2.

As regards the parsing result, it is determined whether the analyzed words can be used as keyword on a word-by-word basis (step S2704). The keyword in this context refers to a word for sifting retrieval results. The keyword is a word which is extracted on the basis of the designated retrieval character sequence, while using, as a key, information on a part of speech such as a noun or a proper noun, or a field information such as a computer-field term or a economics-field term. In this example, the key for keyword extraction is "proper noun". The keyword is stored on a keyword list (step S2705).

It is determined whether the variable n exceeds a scope (step S2706). The scope in this context is a value representing how far a node to be used for key word is distant from the node of the retrieval character sequence. For example, if the scope is assumed to be 5, the keyword extraction is performed in a scope covering nodes which have the distance of 5 or less from the node of the retrieval character sequence. In this embodiment, the scope is set at 2. If the number of links does not exceed the scope, n is incremented by 1 (step S2707) and the keyword retrieval is performed once again. If the number of words exceeds the scope, the search for all words within the scope is completed. Thus, the retrieval condition is generated on the basis of the keyword list and the retrieval character sequence (step S2708), and the process is finished (step S2709). The retrieval condition is delivered to the database retrieval unit 104. The method of preparing the retrieval condition on the basis of the keyword list and retrieval character sequence may be a conventional one.

According to the above process, for example, if the morphological analysis result shown in FIG. 23 is input, the word "Jurassic World" is extracted as keyword, and the retrieval condition for retrieving the retrieval character sequence "director" and "a director of Jurassic World" is prepared, as shown in FIG. 20.

Subsequently, as in the third embodiment, the database retrieval unit 104 retrieves desired data from the database by using the retrieval condition. An output device of the output unit 107 displays the dictionary retrieval result to the user, for example, as shown in FIG. 22.

The present invention is not limited to the third an fourth embodiments. Although the morphological analysis and parsing are adopted as sentence analysis method, a keyword may be simply retrieved. The dictionary of the English language is used as a database in the above embodiments. However, a borrowed-word dictionary, a new-word dictionary or an English-Japanese dictionary, for example, may be substituted.

In the first to fourth embodiments, one sentence including the retrieval character sequence designated by the user is cut out for sentence analysis for keyword extraction. Other methods may be adopted for cutting out a sentence subjected to sentence analysis. For example, a group of sentences, which include one sentence containing the retrieval character sequence designated by the user, and a plurality of sentences before and after this sentence, may be cut out.

(Fifth Embodiment)

A fifth embodiment of the information retrieval apparatus according to the present invention will now be described.

In the first to fourth embodiments, the keyword acquired from the sentence analysis result is used, as such, for retrieval or selection of a retrieval result. In this embodiment, one or more keywords are obtained in addition to the keyword acquired from the sentence analysis result. The former additional keyword(s) is(are) used in place of, or along with, the latter keyword.

This structural feature is applicable to any one of the first to fourth embodiments. In the following description, associated keywords are extracted from a keyword extracted from the sentence analysis result with use of a predetermined database, and at least one of the keywords is used to select specific data from the retrieval results.

The fifth embodiment will now be described mainly with respect points differing from the first embodiment.

Suppose that the information retrieve apparatus of this embodiment is the same as that of the first embodiment. Specifically, the information retrieval apparatus, as shown in FIG. 1, comprises an input unit 101, a retrieval control unit 102, a sentence analysis unit 103, a database retrieval unit 104, an analysis knowledge 105, a database 106 and an output unit 107.

The fifth embodiment differs from the first embodiment in that the above function is added to the retrieval control unit 102, and both embodiments are substantially the same with respect to the other points.

The fifth embodiment will now be described in detail with reference to a specific example.

Suppose that a document has already been input. The user designates through the input unit 101 a given character sequence (i.e. "retrieval character sequence") on which the user seeks detailed information.

For example, FIG. 16 shows a display screen displaying a document ". . . He is a director of Jurassic World . . . ." Suppose that the user has designated the character sequence "director" on this screen by dragging this sequence, using an input device such as a mouse, and has instructed that detailed information on "director" is sought. In addition, suppose that "Jurassic World" is a proper noun meaning a title of movie.

The retrieval control unit 102 cuts out one sentence including the retrieval character sequence designated by the user with use of position data, etc., and delivers it to the sentence analysis unit 103.

In the example in FIG. 16, one sentence including the retrieval character sequence "director", i.e. "He is a director of Jurassic World", is cut out and sent to the sentence analysis unit 103.

The sentence analysis unit 103 performs an analysis process on the sentence delivered from the retrieval control unit 102 by making use of the analysis knowledge 105 and delivers the analysis result to the retrieval control unit 102. The analysis process in this context refers to one or more of morphological analysis, parsing and semantic analysis. Like the first embodiment, a description will now be given of a case where the sentence analysis unit 103 performs the analysis process based on the morphological analysis. FIG. 17 shows an example of an analysis result of the morphological analysis performed on the sentence "He is a director of Jurassic World".

The database retrieval unit 104 retrieves desired data from the database 106 on the basis of the retrieval character sequence "director" input from the retrieval control unit 102, and delivers it to the retrieval control unit 102.

Suppose that the database 106 is a dictionary of the English language, as in the first embodiment, and the retrieval results as shown in FIG. 4 have been obtained.

The analysis result from the sentence analysis unit 103 and the retrieval results from the database retrieval unit 104 are returned to the retrieval control unit 102 and the display content presented to the user is selected.

Figure 25:
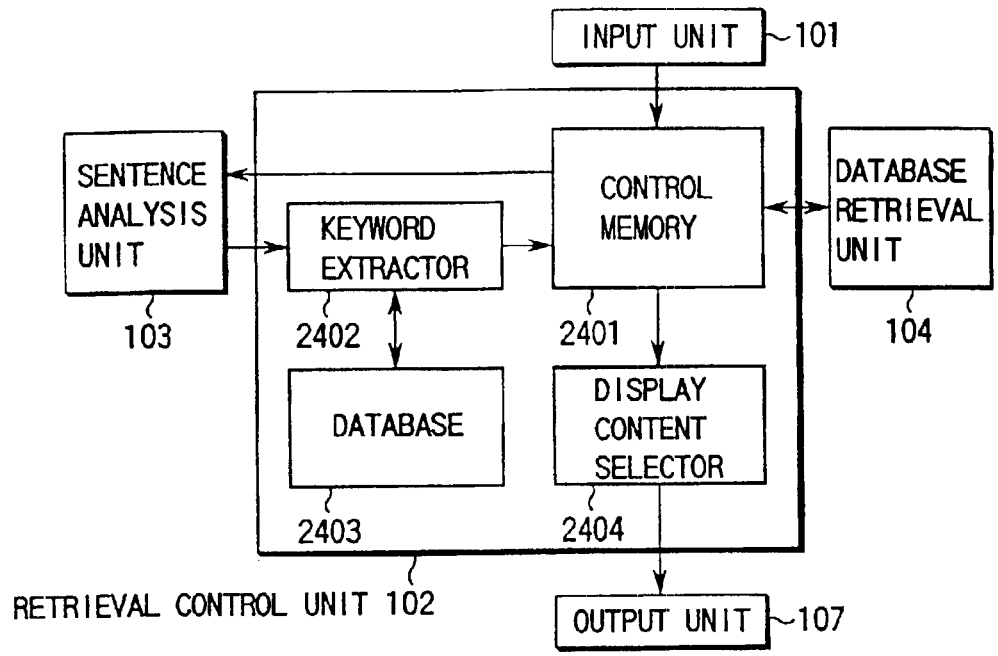
FIG. 25 is a block diagram showing a structure of a retrieval control unit.

FIG. 25 shows an example of the structure of the retrieval control unit 102 in this embodiment. As is shown in FIG. 25, the retrieval control unit 102 comprises a control memory 2401, a keyword extractor 2402, a database 2403 and a display content selector 2404.

The control memory 2401 is the same as the control memory in the first embodiment and is associated with a general control for retrieval. Specifically, the control memory 2401 stores a document input from the input unit 101, sends a retrieval instruction from the user to the database retrieval unit 104, and delivers a cut-out sentence to the sentence analysis unit 103.

The keyword extractor 2402 extracts from the analysis result delivered from the sentence analysis unit 103 a keyword effective for selecting the display content with reference to the database 2403, prepares a keyword list and sends it to the control memory 2401.

Figure 26:
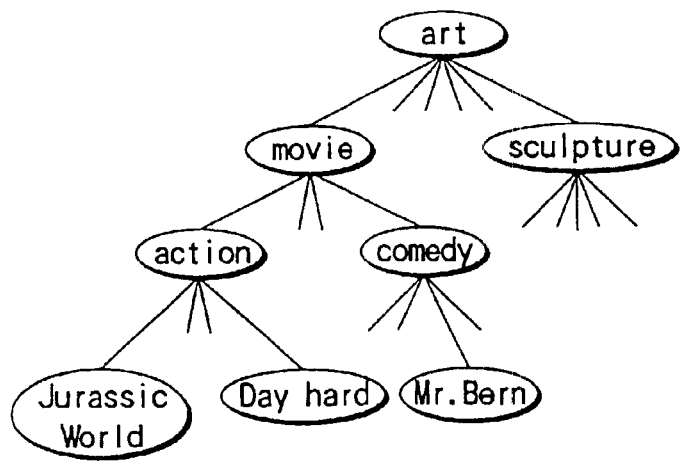
FIG. 26 shows an example of thesaurus data.

Suppose that the database 2403 used in this embodiment is a thesaurus database having thesaurus data representing generic/specific relationships of word concepts. FIG. 26 shows an example of thesaurus data. In FIG. 26, "action" is shown as a generic concept of "Jurassic World" and "Day hard", and "movie" is shown as a generic concept of "action". The expression "Day hard" is a proper noun denoting a title of movie, and "action" is a common noun denoting a genre of movie.

Figure 27:
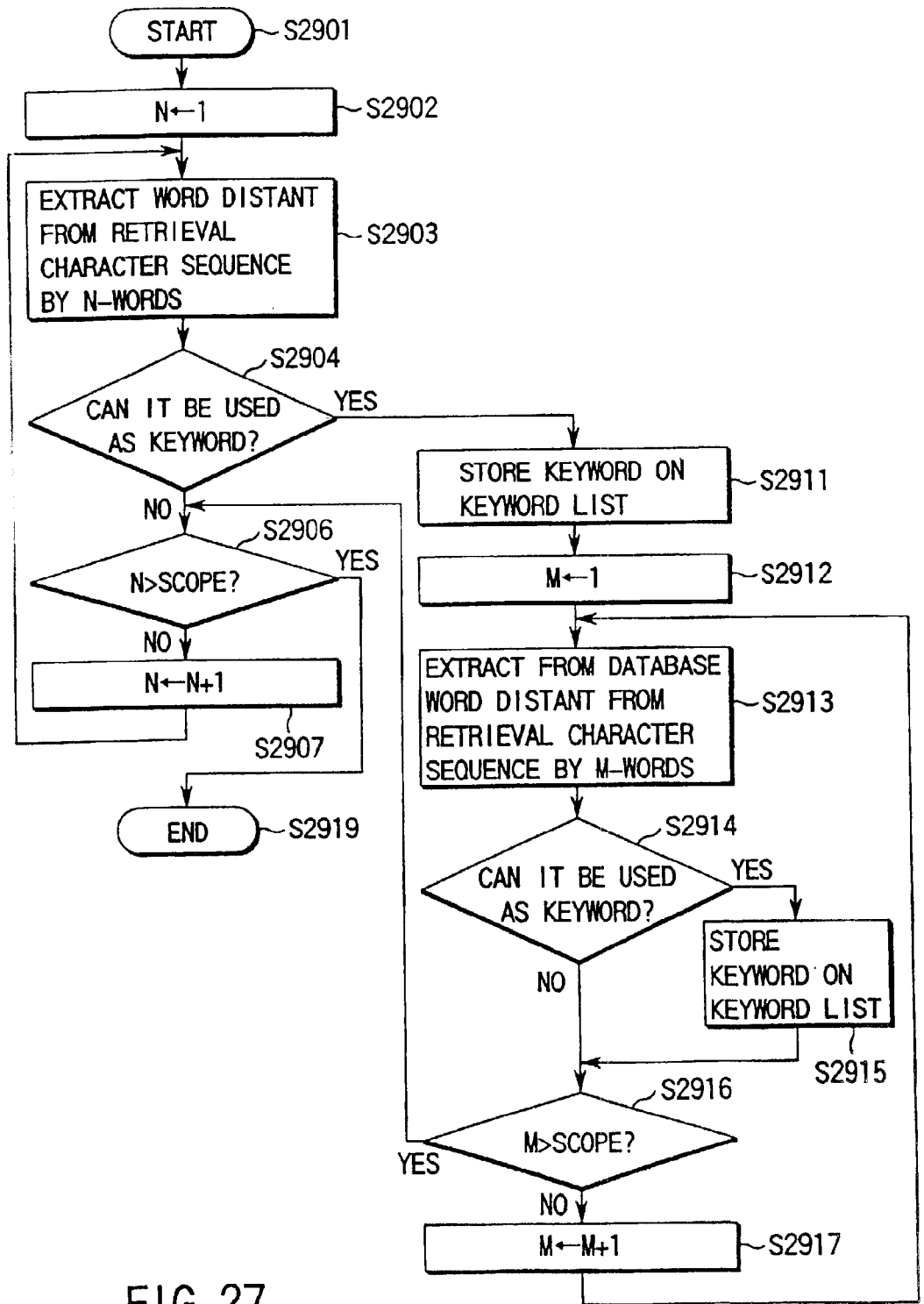
FIG. 27 is a flow chart illustrating an example of a process procedure for selecting display information.

FIG. 27 shows an example of the procedure for forming the keyword list in the keyword extractor 2402.

At first, a variable N is set at 1 (step S2902). This value is a variable representing a distance from the retrieval character sequence ("director" in FIG. 17). The distance in this context is the number of words as counted from the retrieval character sequence.

As regards the morphological analysis result, it is determined whether the analyzed words can be used as keyword on a word-by-word basis (steps S2903 and S2904). The keyword in this context refers to a word for sifting retrieval results. The keyword is a word which is extracted on the basis of the designated retrieval character sequence, while using, as a key, information on a part of speech such as a noun or a proper noun, or a field information such as a computer-field term or a economics-field term. In this example, the key for keyword extraction is "proper noun". The keyword is stored on a keyword list (step S2911).

In this embodiment, if the morphological analysis result shown in FIG. 17 is input, the word "Jurassic World" is extracted as keyword when the variable N=2.

If the keyword has been extracted, a process for extracting words associated with the keyword is executed (steps S2912 to S2917).

A thesaurus is used as the database, and keyword candidates are extracted on the basis of a distance between the keyword and a specified node on the thesaurus. The distance on the thesaurus in this context is expressed by the number of links as counted from the node of the keyword. Specifically, in FIG. 26, a node "action" is distant from a node "Jurassic World" by one link, and a node "Day hard" or "movie" is distant from the node "Jurassic World" by two links.

At first a variable M is set at 1 (step S2912). This variable indicates the distance on the thesaurus from the node of the keyword extracted in step S2904. The words on the thesaurus are examined on a word-by-word basis as to whether they can be used as keyword (steps S2913 and S2914). The key to be used to find a keyword candidate with use of the thesaurus may be different from the key for finding a keyword candidate with use of the morphological analysis result. In this example, the key is set to be a "common noun". The word retrieved as keyword is stored on the keyword list (step S2915).

It is determined whether the variable M exceeds a scope (step S2916). The scope in this context is a value representing the limit number of nodes for keyword extraction, as counted from the node of the keyword to other nodes on the thesaurus. For example, if the scope is 5, the keyword extraction is performed in a scope covering five nodes from the node of the keyword on the thesaurus.

For example, in this embodiment, the scope is set at 2. If the number of nodes does not exceed the scope, M is incremented by 1 (step S2917) and the keyword retrieval is performed once again. If the number of nodes exceeds the scope, the search for all words within the scope is completed and the control returns to step S2906.

In this example, if "Jurassic World" is extracted as keyword, the nodes of "action" and "movie", which are common nouns and are within the distance of "2" from the keyword, are extracted.

In step S2906, it is determined whether the variable N exceeds a scope. The scope in this context is a value representing the limit number of words for keyword extraction, as counted from the retrieval character sequence. For example, if the scope is 5, the keyword extraction is performed in a scope covering five words before and five words after the designated retrieval character sequence. In this embodiment, the scope is set at 3. If the number of words does not exceed the scope, N is incremented by 1 (step S2907) and the keyword retrieval is performed once again. If the number of words exceeds the scope, the search for all words within the scope is completed and the process is finished. The processing result or the keyword list is delivered to the display content selector. If no keyword is extracted, a keyword list showing no keyword is delivered to the display content selector.

According to the above process, for example, if the morphological analysis result shown in FIG. 17 is input, "Jurassic World", "action" and "movie" are extracted as keywords when the process has been finished, and the keywords are delivered to the display content selector 2402.

Figures 28, 29:
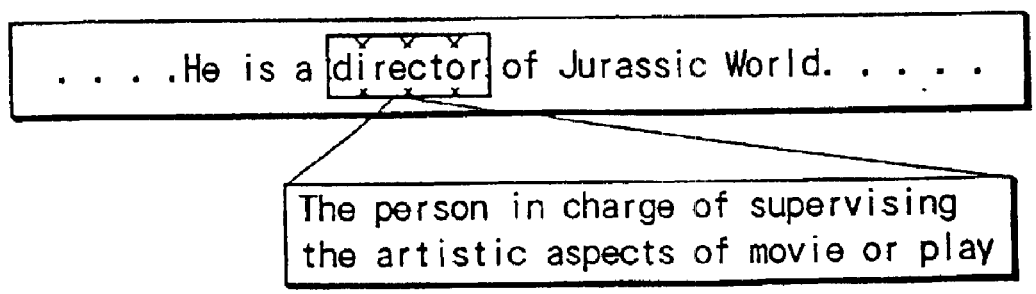
FIG. 28 shows an example of a keyword number table (in the final state)
FIG. 29 shows an example of a display image of a retrieval result.

The display content selector 2404 calculates an evaluation point for the word meanings of the retrieval results according to the method in the first embodiment. The retrieval result with the highest evaluation point is delivered to the output unit 107. FIG. 28 shows a keyword number table in the present embodiment. On the basis of the keyword number table, the second word meaning is selected as the most appropriate one.

For example, a dictionary retrieval result, as shown in FIG. 29, is displayed by the output unit 107.

In the above-described embodiment, the thesaurus is used as database 2403 in FIG. 25. Other databases, however, may be substituted.

Suppose that in the first and second embodiments an English-language document is input, and an English-Japanese dictionary is used as database 106 to be searched in FIG. 1. In this case, even if Japanese-language data is acquired as retrieval results and selection of the retrieval results cannot be made on the basis of an English-language keyword, it is possible to use an English-Japanese dictionary as database 2403 and converts the English-language keyword to a Japanese equivalent, thereby selecting data to be presented from the retrieval results. The same applies to other languages, as a matter of course.

It is possible, for example, to use an English-Japanese dictionary as database 2403 to translate a keyword to a Japanese equivalent, and to enable the database retrieval unit 104 to search the database with use of the Japanese equivalent.

In the above embodiment, the generic concept of the keyword obtained by sentence analysis is found with reference to the thesaurus ("single keyword conversion"). However, for example, it is possible to first find a generic concept of the keyword by using the thesaurus and then find a Japanese equivalent of the generic concept by using an English-Japanese dictionary, thus using the Japanese equivalent for data retrieval ("double keyword conversion"). In this manner, keyword conversion may be performed twice or more.

Alternatively, a plurality of different dictionaries may be used as database 2403, and keywords acquired from the respective dictionaries may be used together.

Besides, it is possible to use, at first, the keyword acquired from the sentence analysis result as it is, as in the first to fourth embodiments. Then, if this keyword is not effective (e.g. if there is no word corresponding to the keyword in retrieval results or headwords), one or more other keywords acquired from the keyword obtained from the sentence analysis result may be used for retrieval processing, as in the present embodiment.

(Sixth Embodiment)

In the first to fifth embodiments, character information is presented as retrieval results. A sixth embodiment of the invention differs from the first to fifth embodiments in that a plurality of multimedia information items such as photographs, figures, sound, image and text are treated as retrieval results. In the other structural aspects, the sixth embodiment is common to the preceding embodiments.

In the case where a plurality of multimedia information items are treated as retrieval results, all multimedia information items associated with a given retrieval character sequence cannot always be displayed (or reproduced).

For example, when a title of music appears in a sentence, audio data can be output but output of image data such as photographs is not proper.

It is thus preferable that when a given retrieval character sequence is designated, kinds of displayable information items associated with the retrieval character sequence are presented to the user with use of a pop-up menu, etc. and the user selects information to be displayed. Some examples of this technique will now be described.

Suppose that a document ". . . He is a director of Jurassic World . . . .", as shown in FIG. 16, has already been input.

The user designates through the input unit 101 a given character sequence (hereinafter "retrieval character sequence") in the document, on which the user wishes to have detailed information.

For example, if the user wishes to obtain detailed information of the character sequence "director", the user has designated the character sequence "director" by dragging this sequence, using the input device such as a mouse. The retrieval control unit, in reply, presents kinds of displayable multimedia information items to the user by a pop-up menu, as shown in FIG. 30.

The user selects his/her desired kind of multi-media information item from the pop-up menu. If the user wishes to acquire detailed information on "works" of "director", he/she designates "works" by using the input device such as a mouse, as shown in FIG. 30.

Figure 31:
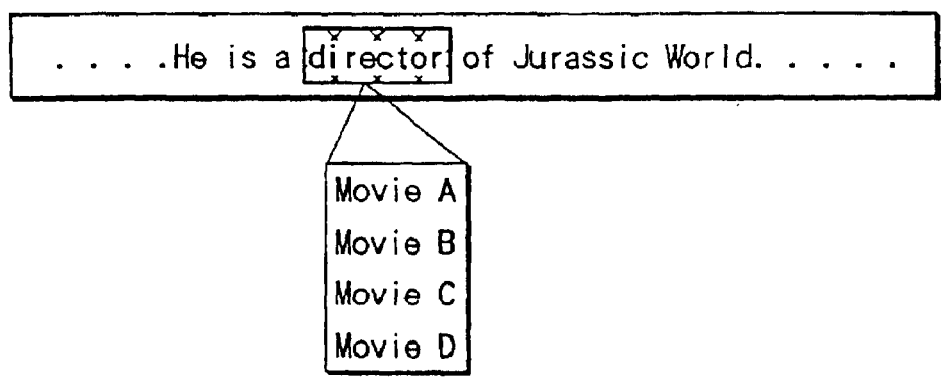
FIG. 31 shows another example of a display image of the retrieval result.

In the present information retrieval apparatus, a list of "works" of "director" designated by the user is displayed by the above-described method, for example, as shown in FIG. 31. Suppose that "movie A", "movie B", "movie C" and "movie D" are proper nouns representing the titles of movies.

Figure 30:
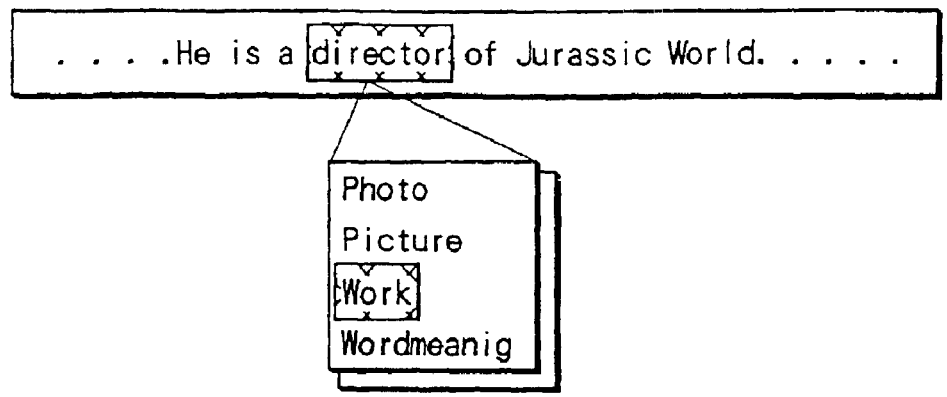
FIG. 30 shows an example of a display image of a pop-up menu.
Figure 32:
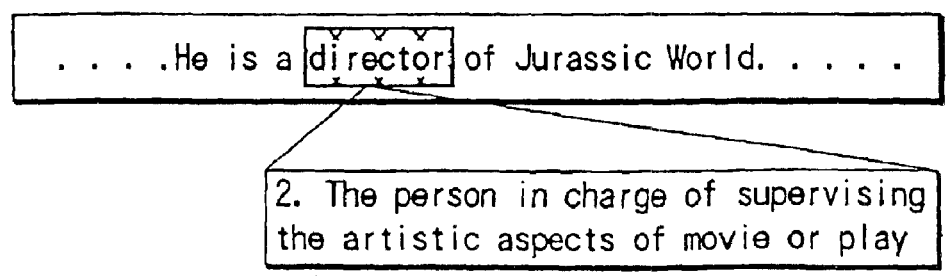
FIG. 32 shows still another example of a display image of the retrieval result.

If "wordmeanings" are designated on the pop-up menu shown in FIG. 30, a word meaning of "director" is displayed, for example, as shown in FIG. 32.

The designation on the pop-up menu may be effected by function keys, the number of clicks on the mouse, drag-and-drop of a selected icon, etc.

In the above example, the kind of information is first chosen and then data is retrieved. Alternatively, it is possible that data is first retrieved and displayable information is presented, and then retrieval results corresponding to the kind designated by the user may be displayed.

Modifications of the above-described embodiments will now be described.

In the above description, under control of the retrieval control unit 102, data is transmitted/received among the respective units via the retrieval control unit 102. In the data transmission/reception, however, real data may be delivered. Alternatively, pointer information such as addresses at which real data is stored may be delivered.

In the above description, the database 106 is provided in the information retrieval apparatus. However, the database 106 may not be provided in the information retrieval apparatus. Alternatively, the information retrieval apparatus may access an external database 106. In either case, a plurality of databases 106 may be searched, and the user may designate one or more databases to be searched.

In the fifth embodiment, the database 2403 is provided in the retrieval control unit 102. However, it may be provided on the outside of the retrieval control unit 102 or the information retrieval apparatus.

When retrieval results are to be displayed, the keyword used in the retrieval may also be presented.

The retrieval functions in the above-described embodiments may be combined, as desired.

The functions described in the above embodiments can be realized by software. Although the information retrieval apparatus of the present invention can be constituted as a special-purpose apparatus, it may be constituted by using a general-purpose computer.

The functions described in the above embodiments may be stored in a recording medium as computer programs, that is, the present invention may be a computer-readable recording medium storing computer programs for enabling a computer to execute predetermined procedures (or for enabling a computer to function as predetermined means, or for enabling a computer to perform predetermined functions).

For example, in FIG. 1, the retrieval control unit 102, sentence analysis unit 103 and database retrieval unit 104 may be recorded on a recording medium as programs for achieving the retrieval control function, sentence analysis function and database retrieval function. In this case, the analysis knowledge 105 and database 106 may be stored on this memory medium. Alternatively, the analysis knowledge 105 and database 106 may be stored on another recording medium (memory) and this recording medium may be driven in combination with the recording medium storing the retrieval control function, sentence analysis function and database retrieval function.

The retrieval functions of the above embodiments may be incorporated, for example, in software for preparing or editing a document, software for browsing a document acquired through WWW (World Wide Web) or E-mail or software for machine translation. For example, such a service system is constituted that document data and a designated retrieval character sequence are received from an origin of request via a network and retrieval results are sent back to the origin of request.

As has been described above, according to the present invention, the user can acquire his/her desired information with high efficiency. In other words, the information desired by the user is presented without the user sifting retrieval results by him/herself. Therefore, the understanding of the sentences is facilitated, and the load on the user can be reduced.

The present invention is not limited to the above-described embodiments, and various modifications may be made within the technical scope of the invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A computer-implemented method, comprising the steps of:

specifying a desired word in a document displayed on a display device;

searching a database on the basis of the specified word and acquiring a plurality of retrieval results;

extracting a sentence including the specified word from the displayed document;

analyzing the sentence extracted in the sentence extracting step;

evaluating each of the plurality of retrieval results obtained in the searching step based on the result of sentence analysis made in the sentence analyzing step; and selecting a predetermined one of the plurality of retrieval results on the basis of the result of evaluation made in the evaluating step, wherein said evaluating step comprises selecting a first keyword from the sentence extracted by said sentence extracting step based on the result of the sentence analysis made by said sentence analyzing step, and calculating the number of occurrences of the first keyword in each of the retrieval results acquired by the searching step, wherein each of the number of occurrences of the keyword and the corresponding retrieval result are stored in a keyword number table, and wherein the selecting step sequentially displays the plurality of retrieval results stored in the keyword number table corresponding to a retrieval result with a largest number of occurrences of the first keyword to a retrieval result with a smallest number of occurrences of the first keyword, said sequentially displayed retrieval results being different from each other.

2. A computer implemented method, comprising the steps of:

specifying a desired word in a document displayed on a display device;

extracting a sentence including the specified word from the displayed document;

analyzing the sentence extracted in the sentence extracting step;

generating a first keyword based on a sentence analysis result analyzed in the sentence analyzing step;

generating a predetermined retrieval formula based on one of the first keyword generated in the keyword generating step and the specified word;

searching a database on the basis of the retrieval formula;

calculating the number of occurrences of the first keyword in each of the retrieval results acquired by the searching step;

storing each of the number of occurrences of the first keyword and the corresponding retrieval result in a keyword number table; and sequentially displaying the plurality of retrieval results stored in the keyword number table corresponding to a retrieval result with a largest number of occurrences of the first keyword to a retrieval result with a smallest number of occurrences of the first keyword, said sequentially displayed retrieval results being different from each other.

* * * * *